(12) United States Patent
Nishiki et al.

(10) Patent No.: US 11,895,000 B2
(45) Date of Patent: Feb. 6, 2024

(54) PACKET TRANSFER DEVICE, PACKET TRANSFER METHOD, AND PACKET TRANSFER PROGRAM

(71) Applicant: Nippon Telegraph and Telephone Corporation, Tokyo (JP)

(72) Inventors: Masayuki Nishiki, Musashino (JP); Masato Nishiguchi, Musashino (JP); Yuki Takei, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 40 days.

(21) Appl. No.: 17/630,997

(22) PCT Filed: Aug. 1, 2019

(86) PCT No.: PCT/JP2019/030383
§ 371 (c)(1),
(2) Date: Jan. 28, 2022

(87) PCT Pub. No.: WO2021/019791
PCT Pub. Date: Feb. 4, 2021

(65) Prior Publication Data
US 2022/0263745 A1 Aug. 18, 2022

(51) Int. Cl.
*H04L 43/106* (2022.01)
*H04L 47/28* (2022.01)
(52) U.S. Cl.
CPC ............ *H04L 43/106* (2013.01); *H04L 47/28* (2013.01)

(58) Field of Classification Search
CPC ... H04L 43/106; H04L 47/28; H04L 43/0852; H04L 49/3009; H04L 12/40189
See application file for complete search history.

(56) References Cited

U.S. PATENT DOCUMENTS

2017/0346714 A1* 11/2017 Mizrahi .............. H04L 43/0858
2018/0107626 A1* 4/2018 Shao .................. G06F 13/4295

OTHER PUBLICATIONS

Bosshart et al., "P4: Programming Protocol-Independent PacketProcessors," ACM SIGCOMM Computer Communication Review, 2014, 44(3):87-95, 10 pages.
Kamp, "Timecounters: Efficient and precise timekeeping in SMP kernels," Proceedings of the BSDCon Europe, Nov. 15, 2002, 13 pages.
Kim et al., "In-band Network Telemetry (INT)," p4.org, Jun. 19, 2016, retrieved from URL </http://p4.org/wp-content/uploads/fixed/INT/INT-current-spec.pdf>, 28 pages.
Kim et al., "In-band network telemetry via programmable dataplanes," ACM SIGCOMM 2015, Aug. 18, 2015, retrieved from URL <https://pdfs.semanticscholar.org/a3f1/9dc8520e2f42673be7cbd8d80cd96e3ec0c1.pdf>, 2 pages.

(Continued)

Primary Examiner — Nishant Divecha
(74) Attorney, Agent, or Firm — Fish & Richardson P.C.

(57) ABSTRACT

A packet transfer apparatus registers time information from a system clock on a CPU region to a time information holding table on a hardware region, adds a receiving time to a received packet using a counter value on a hardware clock and the time information registered in the table, and transfers, to a transfer destination, the packet to which the receiving time has been added.

6 Claims, 8 Drawing Sheets (56) References Cited

OTHER PUBLICATIONS

Takei, "Implementation and examination of programmable switches for P4 / Stratum utilization," MPLS Japan 2018, Nov. 19, 2018, retrieved from URL <https://www.mpls.jp/2018/presentations/MPLS-JAPAN2018-takei.pdf>, 61 pages (with English Translation).

* cited by examiner

PACKET TRANSFER DEVICE, PACKET TRANSFER METHOD, AND PACKET TRANSFER PROGRAM

CROSS-REFERENCE TO RELATED APPLICATIONS

This application is a National Stage application under 35 U.S.C. § 371 of International Application No. PCT/JP2019/030383, having an International Filing Date of Aug. 1, 2019. The disclosure of the prior application is considered part of the disclosure of this application, and is incorporated in its entirety into this application.

TECHNICAL FIELD

The present invention relates to a packet transfer apparatus, a packet transfer method, and a packet transfer program.

BACKGROUND ART

Heretofore, techniques for measuring a transfer time in units of packets that pass through a plurality of apparatuses include a technique in which a packet transfer apparatus reads a counter value of a clock on hardware, and embeds this data in every packet as metadata.

CITATION LIST

Non Patent Literature

[NPL 1] "In-band Network Telemetry (INT)", June 2016., [online], [retrieved on Jul. 29, 2019], Internet<https://p4.org/assets/INT-current-spec.pdf>

SUMMARY OF THE INVENTION

Technical Problem

However, with techniques of conventional packet transfer apparatuses, there is a problem in that, when the upper limit of a counter value on hardware is exceeded, appropriate time information cannot be added to packets and a transfer time cannot be appropriately measured, in some cases. For example, in conventional packet transfer apparatuses, there is an upper limit to a counter (value) that can be held by a hardware clock, and thus, when, in a packet transfer section targeted for measurement, the measurement time exceeds the upper limit that can be measured by the counter, there is a problem in that overflow occurs in the counter and measurement cannot be performed.

Means for Solving the Problem

In order to solve the problems described above and achieve an object, a packet transfer apparatus according to the present invention includes: a registration unit configured to register time information from a system clock on a CPU region to a table on a hardware region; an addition unit configured to add a receiving time to a received packet using a counter value on a hardware clock and the time information registered in the table; and a transfer unit configured to transfer, to a transfer destination, the packet to which the receiving time has been added by the addition unit.

Effects of the Invention

According to the present invention, effects are achieved that appropriate time information can be added to packets, and a transfer time can be appropriately measured.

DESCRIPTION OF EMBODIMENTS

The following describes an embodiment of a packet transfer apparatus, a packet transfer method, and a packet transfer program according to the present application in detail with reference to the drawings. Note that the packet transfer apparatus, the packet transfer method, and the packet transfer program according to the present application are not limited by the embodiment described below.

First Embodiment

In an embodiment below, an overview of a system that includes packet transfer apparatuses 10 according to a first embodiment, the configuration of the packet transfer apparatus 10, and a flow of processing that is performed by each packet transfer apparatus 10 will be described in the stated order, and lastly effects of the first embodiment will be described.

System Configuration

Figure 1:
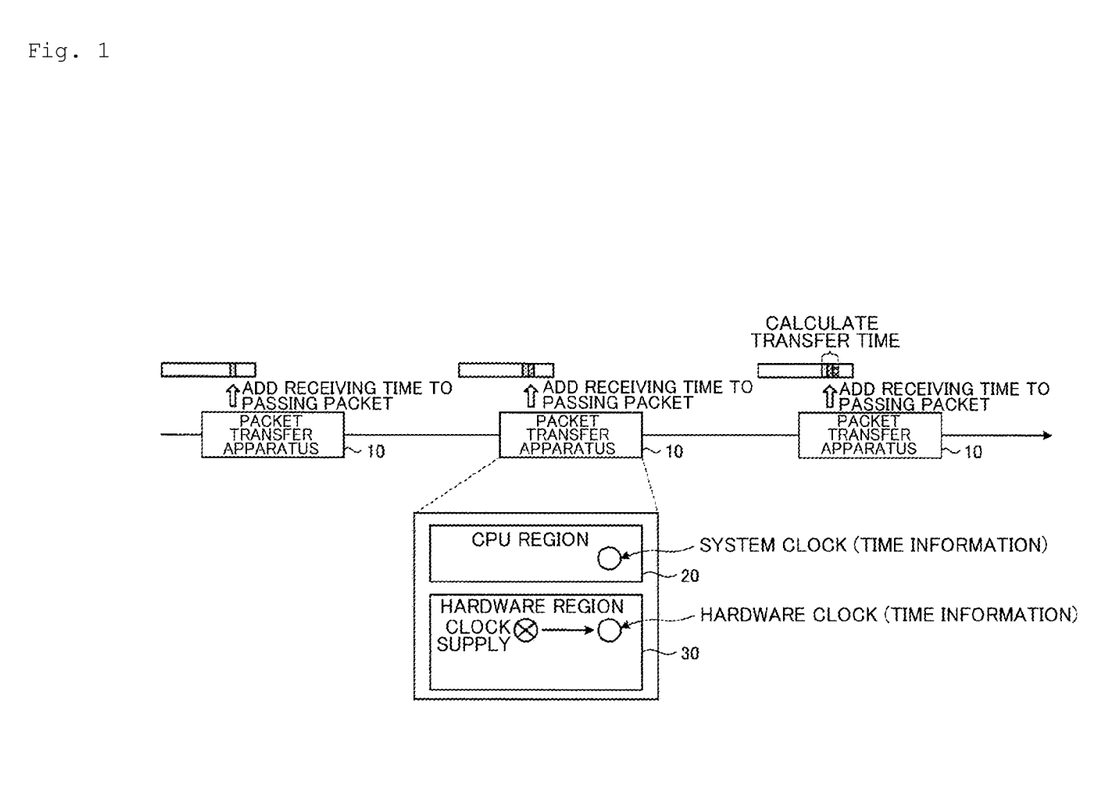
FIG. 1 is a diagram illustrating an overview of a system that includes a packet transfer apparatus according to a first embodiment.

First, the configuration of a system that includes packet transfer apparatuses 10 will be described with reference to FIG. 1. FIG. 1 is a diagram illustrating an overview of a system that includes packet transfer apparatuses according to the first embodiment. As illustrated in FIG. 1, the system includes a plurality of packet transfer apparatuses 10. When each packet transfer apparatus 10 receives a packet from another packet transfer apparatus 10, the packet transfer apparatus 10 adds the receiving time to the packet, and transfers the packet to another packet transfer apparatus 10 that is a transfer destination. Accordingly, the packet includes transfer times added by packet transfer apparatuses 10, and a packet transfer time can be calculated based on these transfer times.

In addition, each packet transfer apparatus 10 includes a system clock on a CPU region 20 and a hardware clock on a hardware region 30. Data (times) of the system clock and the hardware clock are continuously updated in accordance with supply of clock signals. The packet transfer apparatus 10 according to the first embodiment registers time information from the system clock on the CPU region 20 to a time information holding table 31a on the hardware region 30. The packet transfer apparatus 10 according to the first embodiment adds a receiving time to a received packet using the counter value on the hardware clock and the time information registered in the table, and transfers the packet to which the receiving time has been added, to a transfer destination.

Accordingly, in the packet transfer apparatuses 10 according to the first embodiment, even when the upper limit of the counter on the hardware region 30 is exceeded, a packet transfer time can be appropriately measured.

Configuration of Packet Transfer Apparatus

Figure 2:
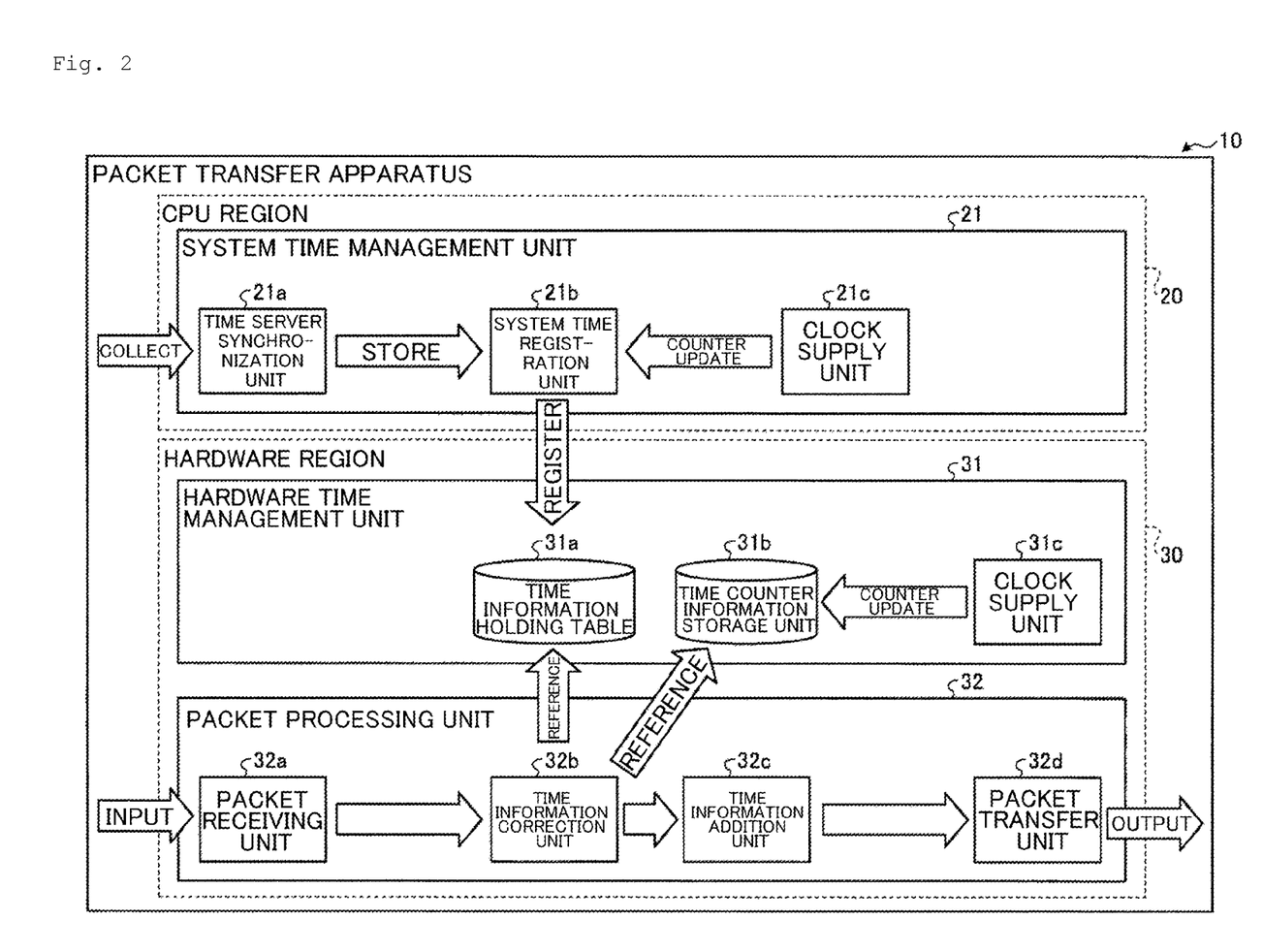
FIG. 2 is a diagram showing an example of the configuration of the packet transfer apparatus according to the first embodiment.

Here, the configuration of each packet transfer apparatuses 10 will be described with reference to FIG. 2. FIG. 2 is a diagram showing an example of the configuration of the packet transfer apparatus according to the first embodiment. As shown in FIG. 2, the packet transfer apparatus 10 includes a system time management unit 21 in the CPU region 20, and the hardware time management unit 31 and a packet processing unit 32 in the hardware region 30. Processing that is performed by each unit of the packet transfer apparatus 10 will be described below.

The system time management unit 21 holds a time at which a sufficiently long transfer time can be ensured in cooperation with an external time server (not illustrated). The system time management unit 21 is a function unit for obtaining/holding a precise time. The hardware time management unit 31 holds the time registered therein from the system time management unit 21 and a counter time that is subjected to clock update. The hardware time management unit 31 is a function unit for maintaining information for providing time information at a high speed in accordance with a transfer packet. The packet processing unit 32 collects time information for a time point when a packet was received, adds metadata information to the packet itself, and transfers the packet to a transfer destination. The packet processing unit 32 is a function unit for providing time information to transfer packets.

The system time management unit 21 includes a time server synchronization unit 21a, a system time registration unit 21b, and a clock supply unit 21c. The time server synchronization unit 21a periodically collects precise time information from an external time server (not illustrated), and stores the collected time information as time information of the system clock, in the system time registration unit 21b. The system time registration unit 21b registers the time information of the system clock from the system clock on the CPU region to the time information holding table 31a on the hardware region. For example, the system time registration unit 21b updates the time information registered in the time information holding table 31a at a predetermined time interval. The clock supply unit 21c generates a clock signal at a predetermined interval, and updates the counter value of the system clock.

A hardware time management unit 31 includes the time information holding table 31a, a time counter information storage unit 31b, and a clock supply unit 31c. The time information holding table 31a stores time information registered by the system time registration unit 21a. The time counter information storage unit 31b stores the counter value of the hardware clock. The clock supply unit 31c generates a clock (signal) at a predetermined interval, and updates the counter value of the hardware clock.

The packet processing unit 32 includes a packet receiving unit 32a, a time information correction unit 32b, a time information addition unit 32c, and a packet transfer unit 32d. The packet receiving unit 32a receives packets transferred from another packet transfer apparatus. The time information correction unit 32b corrects time information registered in the time information holding table 31a, using the counter value on the hardware clock.

The time information addition unit 32c adds a receiving time to a received packet using the counter value on the hardware clock and the time information registered in the time information holding table. For example, the time information addition unit 32c adds, to the packet, time information corrected by the time information correction unit 32b, as a receiving time. The packet transfer unit 32d transfers, to a transfer destination, the packet to which the receiving time has been added by the time information addition unit 32c.

Figure 3:
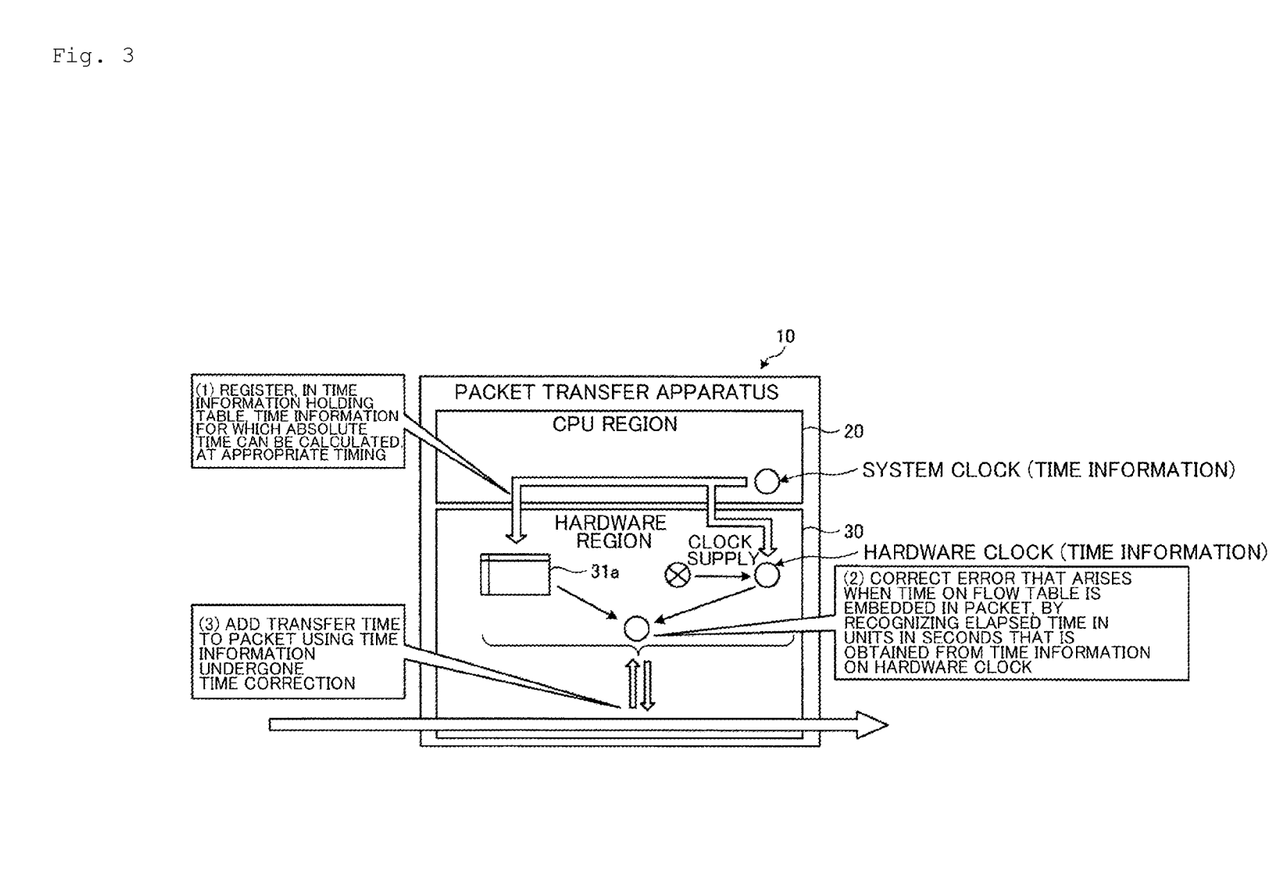
FIG. 3 is a diagram illustrating an example of a series of packet transfer processing that is performed by the packet transfer apparatus according to the first embodiment.

Here, an example of a series of packet transfer processing that is performed by each packet transfer apparatus 10 will be described with reference to FIG. 3. FIG. 3 is a diagram illustrating an example of a series of packet transfer processing that is performed by the packet transfer apparatus according to the first embodiment. As illustrated in FIG. 3, the packet transfer apparatus 10 registers time information, based on which an absolute timing can be calculated, to the time information holding table 31a at an appropriate timing (see (1) in FIG. 3).

The packet transfer apparatus 10 then corrects error that arises when the time on the flow table is embedded in a packet, by recognizing an elapsed time in units of seconds that is obtained from the time information on the hardware clock (see (2) in FIG. 3). The packet transfer apparatus 10 then adds a transfer time (receiving time) to the packet using the time information subjected to time correction (see (3) in FIG. 3).

Thus, even when the counter upper limit is exceeded, the packet transfer apparatus 10 can add a receiving time to a packet, by using the counter value of the hardware clock as time information that is to be added to a transfer packet, in combination with the time information registered in advance from the system clock on the CPU to the time information holding table 31a on the hardware. Furthermore, in registration of system clock information to the time information holding table 31a, the packet transfer apparatuses 10 can efficiently utilize the system resources as a result of suppressing the registration frequency while maintaining the necessary and sufficient time accuracy by controlling the registration timing.

Figure 4:
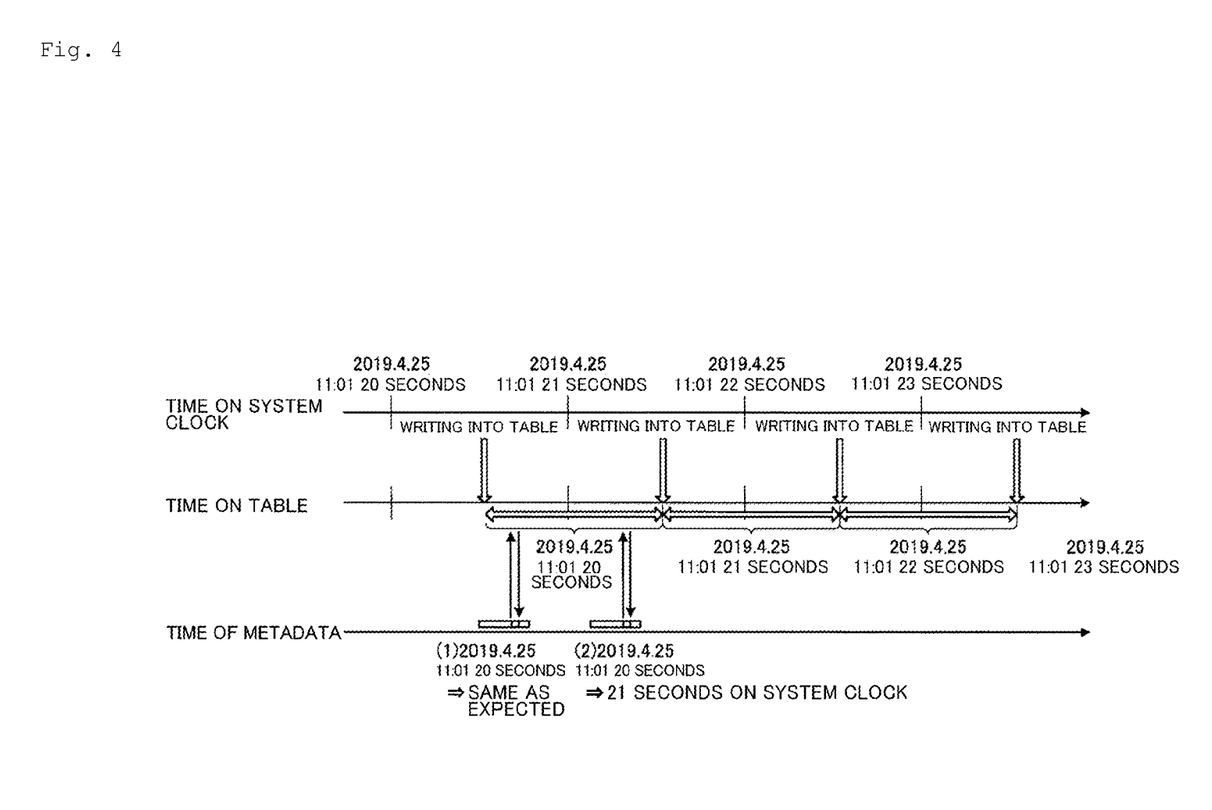
FIG. 4 is a diagram illustrating time information on a flow table.

Here, the time information on a flow table will be described with reference to FIG. 4. FIG. 4 is a diagram illustrating time information on a flow table. As illustrated in FIG. 4, the packet transfer apparatuses 10 continuously updates the data (time) of the system clock in accordance with supply of clock signals. In addition, when time information is held in the time information holding table 31a (table), the packet transfer apparatuses 10 is not supplied with a clock signal, and thus the time gains only at a timing when the table is updated. The example in FIG. 4 illustrates a case where the time on the time information holding table 31a is updated in units of seconds.

Therefore, if the packet transfer apparatuses 10 uses the time on the time information holding table 31a as time of metadata that is to be added to a packet without any change, the time of the metadata may be different from the time on the system clock. As illustrated in FIG. 4, for example, in the packet transfer apparatus 10, when the time in the time information holding table 31*a* has been updated to 2019.4.25 11:01:20, and the time on the system clock has not been updated, the time of the metadata is the same, namely 2019.4.25 11:01:20 (see (1) in FIG. 4). In addition, in the packet transfer apparatuses 10, if the time on the system clock is updated to 2019.4.25 11:01:21 after the time on the time information holding table 31*a* is updated to 2019.4.25 11:01:20, the time of the metadata is 2019.4.25 11:01:20, which is different from the time on the system clock (see (2) in FIG. 4).

In the packet transfer apparatus 10, the system time registration unit 21*b* in the CPU region 20 periodically updates the times on the hardware clock and the time information holding table 31*a* at the same time such that the time of metadata does not differ from the time on the system clock, corrects error in the time of the time information holding table 31*a* using the count value of the hardware clock, and adds, to the packet, metadata that represents the same time as the time on the system clock. Thus, in the packet transfer apparatus 10, it is possible to correct error that arises when the time on the flow table is embedded in a packet, by recognizing an elapsed time in units of seconds that is obtained from the time information on the hardware clock.

Processing Procedure of Packet Transfer Apparatus

Figure 5:
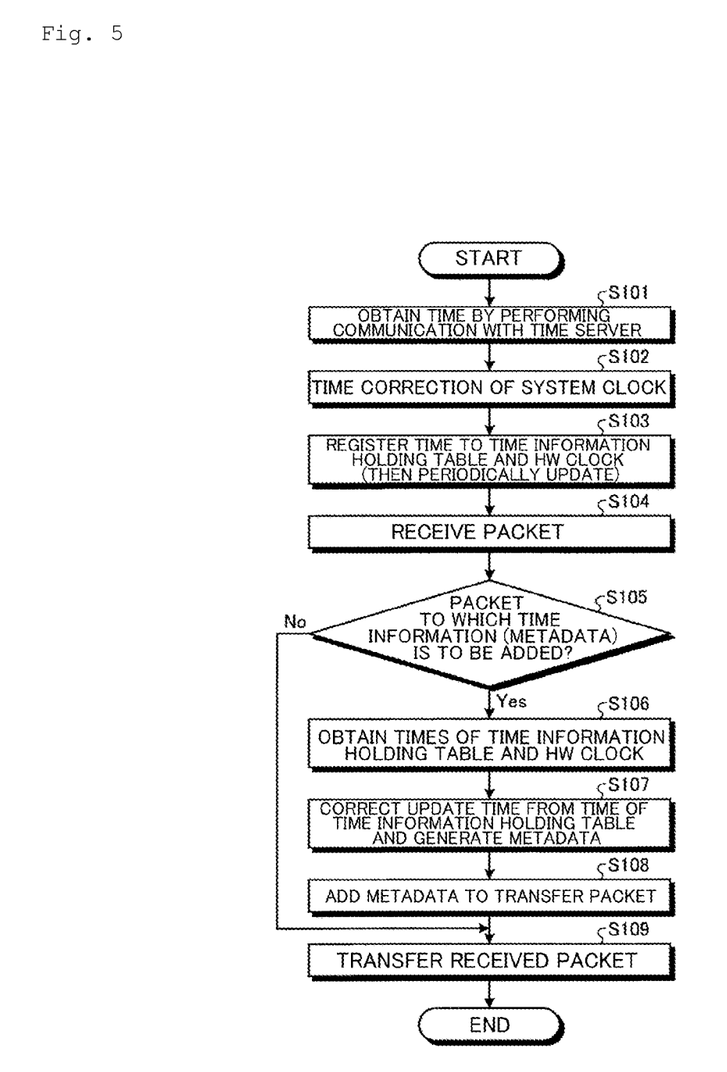
FIG. 5 is a flowchart showing an example of a flow of processing that is performed by the packet transfer apparatus according to the first embodiment.

Next, an example of a processing procedure that is performed by the packet transfer apparatus 10 according to the first embodiment will be described with reference to FIG. 5. FIG. 5 is a flowchart showing an example of a flow of processing that is performed by the packet transfer apparatus according to the first embodiment.

As illustrated in FIG. 5, the time server synchronization unit 21*a* of the packet transfer apparatus 10 obtains the time by performing communication with an external time server (step S101), and corrects the time on the system clock (step S102). Next, the system time registration unit 21*b* registers the time information of the system clock to the time information holding table 31*a* and the hardware (HW) clock (step S103). Note that, from this point on, the system time registration unit 21*b* periodically repeats the processing for registering the time information of the system clock to the time information holding table 31*a* and the hardware (HW) clock.

Upon receiving a packet (step S104), the packet receiving unit 32*a* determines whether or not the received packet is a packet to which time information (metadata) is to be added (step S105). If, as a result, the packet receiving unit 32*a* determines that the received packet is not a packet to which time information (metadata) is to be added (step S105: No), the packet transfer unit 32*d* transfers the received packet (step S109), and ends the processing.

In addition, if the packet receiving unit 32*a* determines that the received packet is a packet to which time information (metadata) is to be added (step S105: Yes), the time information correction unit 32*b* obtains the time information of the time information holding table 31*a* and the counter value of the hardware clock (step S106), and corrects the time of the time information holding table 31*a* using the counter value of the hardware clock and generates metadata (step S107).

The time information addition unit 32*c* then adds, to the packet, the metadata generated by the time information correction unit 32*b* (step S108). The packet transfer unit 32*d* transfers, to a transfer destination, the received packet to which the metadata has been added by the time information addition unit 32*c* (step S109).

Effects of First Embodiment

Thus, the packet transfer apparatus 10 includes the system clock on the CPU region 20 and the hardware clock on the hardware region 30. Data (times) of the system clock and the hardware clock are continuously updated in accordance with supply of clock signals. The packet transfer apparatus 10 according to the first embodiment registers time information from the system clock on the CPU region 20 to the time information holding table 31*a* on the hardware region 30, adds a receiving time to a received packet using the counter value on the hardware clock and the time information registered in the table, and transfers the packet to which the receiving time has been added, to a transfer destination. Thus, in the packet transfer apparatus 10 according to the first embodiment, even when the upper limit of the counter is exceeded on the hardware region 30, an appropriate receiving time can be added to a packet, and, as a result, the packet transfer time can be appropriately measured.

With the packet transfer apparatuses 10, as a result of using, as time information to be added to the transfer packet, the counter value of the hardware clock in combination with the time information registered in advance from the system clock on the CPU to the time information holding table 31*a* on the hardware, the transfer time can be measured even when the counter upper limit is exceeded. Furthermore, with the packet transfer apparatus 10, in registration of system clock information to the time information holding table 31*a*, the system resources can be efficiently used as a result of suppressing the registration frequency while maintaining the necessary and sufficient time accuracy by controlling the registration timing.

With the packet transfer apparatus 10, it is possible to extent the measurable time range by holding time information using the flow table in addition to holding hardware clock information in which the counter number is limited, for example. In addition, with the packet transfer apparatus 10, it is possible to correct error that arises when the time on the flow table is embedded in a packet by recognizing an elapsed time in units in seconds that is obtained from time information on the hardware clock.

In the packet transfer apparatus 10, a transfer time can be measured even when a longer transfer time needs to be measured, by realizing a mechanism for holding time information that exceeds the counter value on the hardware. In addition, in the packet transfer apparatus 10, it is possible to suppress consumption of the CPU resources required for result time synchronization by realizing a mechanism for suppressing the frequency at which time information is registered in the time information holding table 31*a*.

Modified Example

Note that the above first embodiment is not limited to a case where each packet transfer apparatus 10 periodically updates the times on the hardware clock and the time information holding table 31*a* at the same time. A configuration may also be adopted in which, for example, the packet transfer apparatus updates the times on the hardware clock and the time information holding table 31*a* at the same time for the first time only, and, after that, updates only the time on the time information holding table 31*a*. In view of this, a case will be described below in which a packet transfer apparatus 10A according to a modified example updates the times on the hardware clock and the time information holding table 31*a* at the same time for the first time only, and, after that, updates the time on the time information holding table 31*a* only. Note that, regarding the packet transfer apparatuses 10A according to the modified example, a description of configurations and processing similar to those of the first embodiment is omitted.

Figure 6:
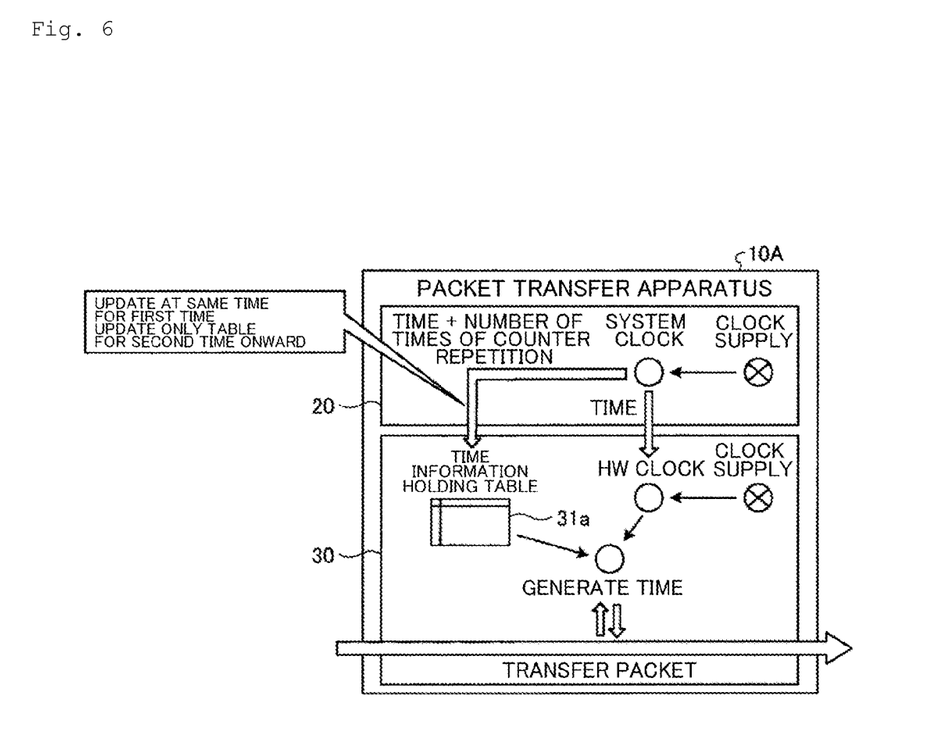
FIG. 6 is a diagram illustrating an overview of a packet transfer apparatus according to a modified example.

Here, an overview of the packet transfer apparatus according to the modified example will be described with reference to FIG. 6. FIG. 6 is a diagram illustrating an overview of the packet transfer apparatus according to the modified example. As illustrated in FIG. 6, the packet transfer apparatus 10A according to the modified example updates the times of the hardware clock and the time information holding table 31a at the same time for the first time only. Also, the packet transfer apparatus 10A makes a notification of the time of the time information holding table 31a and the number of times of counter repetition of the hardware clock. This number of times of repetition can be calculated based on the number of bits of the hardware clock.

Figure 7:
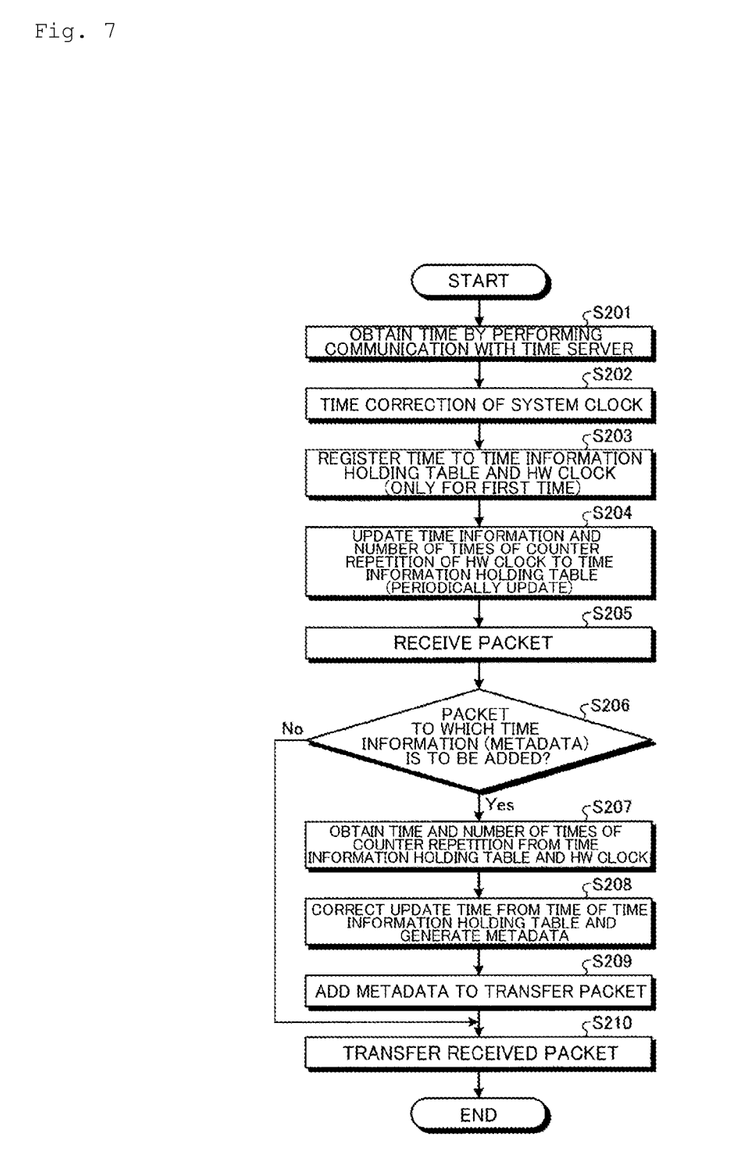
FIG. 7 is a flowchart showing an example of a flow of processing that is performed by the packet transfer apparatus according to the modified example.

Next, an example of a processing procedure that is performed by the packet transfer apparatus 10A according to the modified example will be described with reference to FIG. 7. FIG. 7 is a flowchart showing an example of a flow of processing that is performed by the packet transfer apparatus according to the modified example.

As illustrated in FIG. 7, the time server synchronization unit 21a of the packet transfer apparatus 10A obtains the time by performing communication with an external time server (step S201), and corrects the time of the system clock (step S202). Next, the system time registration unit 21b registers the time information of the system clock to the time information holding table 31a and the hardware (HW) clock (step S203). Note that the system time registration unit 21b registers the time information of the system clock to the time information holding table 31a and the hardware (HW) clock, only for the first time.

The system time registration unit 21b then updates time information of the system clock and the number of times of counter repetition of the hardware clock to the time information holding table (step S204). Note that, from this time on, the system time registration unit 21b periodically repeats processing for updating the time information of the system clock and the number of times of counter repetition of the hardware clock to the time information holding table 31a.

Thereafter, upon receiving packets (step S205), the packet receiving unit 32a determines whether or not the received packets are packets to which time information (metadata) is to be added (step S206). As a result, if the packet receiving unit 32a determines that received packets are not packets to which time information (metadata) is to be added (step S206: No), the packet transfer unit 32d transfers the received packets (step S210), and ends the processing.

If the packet receiving unit 32a determines that the received packets are packets to which time information (metadata) is to be added (step S206: Yes), the time information correction unit 32b obtains time information of the time information holding table 31a and the counter value of the hardware clock (step S207), and corrects the time information of the time information holding table 31a using the counter value of the hardware clock and the number of times of counter repetition and generates metadata (step S208).

The time information addition unit 32c then adds, to the packet, the metadata generated by the time information correction unit 32b (step S209). Next, the packet transfer unit 32d transfers, to a transfer destination, the received packet to which the metadata has been added by the time information addition unit 32c (step S210).

Thus, the packet transfer apparatus 10A according to the modified example updates the times of the hardware clock and the time information holding table 31a at the same time, only for the first time, and, after that, updates only the time of the time information holding table 31a, and thus the hardware clock is not periodically updated.

System Configuration

The constituent elements of each apparatus illustrated in drawings are functionally conceptual and are not necessarily physically configured as illustrated in drawings. In other words, the specific aspects of separation and integration of the apparatus are not limited to those illustrated in drawings, and all or some of the constituent elements may be separated or integrated functionally or physically in any units depending on various types of loads and states of use, for example. All or any of the processing functions performed by the apparatus may be realized by a CPU and a program analyzed and executed by the CPU, or realized as hardware using a wired logic.

Out of the processing described in the present embodiment, all or part of the processing described as automatically performed processing may be performed manually. Alternatively, all or part of the processing described as manually performed processing may also be performed automatically using a known method. The processing procedures, the control procedures, the specific names, and the information including various types of data and parameters described in the present specification and shown in the drawings can be changed as appropriate unless otherwise stated.

Program

Figure 8:
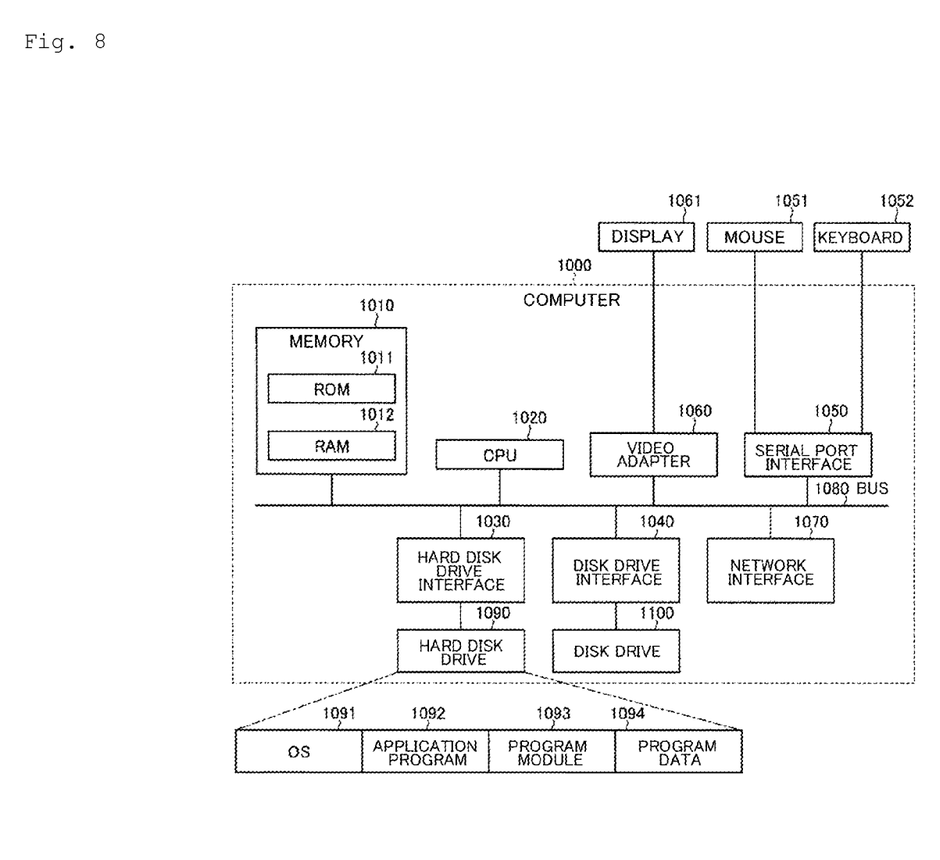
FIG. 8 is a diagram showing a computer that executes a packet transfer program.

FIG. 8 is a diagram showing a computer that executes a packet transfer program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These units are connected via a bus 1080.

The memory 1010 includes a ROM (Read Only Memory) 1011 and a RAM 1012. A boot program such as a BIOS (Basic Input Output System) boot program is stored in the ROM 1011, for example. The hard disk drive interface 1030 is connected to a hard disk drive 1090. The disk drive interface 1040 is connected to a disk drive 1100. A detachable storage medium such as a magnetic disk or an optical disk is inserted into the disk drive 1100, for example. The serial port interface 1050 is connected to a mouse 1051 and a keyboard 1052, for example. The video adapter 1060 is connected to a display 1061, for example.

An OS 1091, an application program 1092, a program module 1093, and program data 1094 are stored in the hard disk drive 1090, for example. Accordingly, a program that defines processing performed by the packet transfer apparatus 10 is implemented as the program module 1093 in which codes that can be executed by the computer are written. The program module 1093 is stored in the hard disk drive 1090, for example. For example, the program module 1093 for executing processing similar to a functional constituent element of the apparatus is stored in the hard disk drive 1090. Note that the hard disk drive 1090 may be replaced with an SSD (Solid State Drive).

Data that is used in the processing in the above-described embodiment is stored as the program data 1094 in the memory 1010 or the hard disk drive 1090, for example. The CPU 1020 reads out the program module 1093 and the program data 1094 stored in the memory 1010 or the hard disk drive 1090 into the RAM 1012 as necessary and executes them.

Note that the program module 1093 and the program data 1094 do not necessarily need to be stored in the hard disk drive 1090, and may also be stored in a detachable storage medium and read out by the CPU 1020 via the disk drive 1100 or the like, for example. Alternatively, the program module 1093 and the program data 1094 may also be stored in another computer that is connected via a network or WAN. The program module 1093 and the program data 1094 may also be read out from another computer by the CPU 1020 via the network interface 1070.

REFERENCE SIGNS LIST

10, 10A Packet transfer apparatus
20 CPU region
21 System time management unit
21*a* Time server synchronization unit
21*b* System time registration unit
21*c* Clock supply unit
30 Hardware region
31 Hardware time management unit
31*a* Time information holding table
31*b* Time counter information storage unit
31*c* Clock supply unit
32 Packet processing unit
32*a* Packet receiving unit
32*b* Time information correction unit
32*c* Time information addition unit
32*d* Packet transfer unit

The invention claimed is:

1. A packet transfer apparatus comprising one or more processors configured to:
   obtain time information from a system clock on a CPU region at a predetermined time interval;
   periodically register the obtained time information into a table and a hardware clock on a hardware region,
      wherein periodically registering the obtained time information into the table and the hardware clock comprises:
      updating the table and the hardware clock at the same time for the first time, and periodically updating only the table after the first time;
   receive a packet;
   determine a receiving time using i) the time information periodically updated in the table in the hardware region and ii) a counter value of the hardware clock on the hardware region that indicates an elapsed time;
   add the receiving time to the received packet; and
   transfer, to a transfer destination, the packet to which the receiving time has been added.

2. The packet transfer apparatus according to claim 1, wherein the one or more processors are configured to correct the time information periodically registered in the table using the counter value on the hardware clock, and
   add the corrected time information to the packet as the receiving time.

3. A packet transfer method that is executed by a packet transfer apparatus, the method comprising:
   obtaining time information from a system clock on a CPU region at a predetermined time interval;
   periodically registering the obtained time information into a table and a hardware clock on a hardware region,
      wherein periodically registering the obtained time information into the table and the hardware clock comprises:
      updating the table and the hardware clock at the same time for the first time, and periodically updating only the table after the first time;
   receiving a packet;
   determining a receiving time using i) the time information periodically registered in the table on the hardware region and ii) a counter value of a hardware clock on the hardware region that indicates an elapsed time;
   adding the receiving time to the received packet; and
   transferring, to a transfer destination, the packet to which the receiving time has been added.

4. The packet transfer method according to claim 3, comprising:
   correcting the time information periodically registered in the table using the counter value on the hardware clock; and
   adding the corrected time information to the packet as the receiving time.

5. A non-transitory computer readable medium storing one or more instructions for causing a computer to execute:
   obtaining time information from a system clock on a CPU region at a predetermined time interval;
   periodically registering the obtained time information into a table and a hardware clock on a hardware region,
      wherein periodically registering the obtained time information into the table and the hardware clock comprises:
      updating the table and the hardware clock at the same time for the first time, and periodically updating only the table after the first time;
   receiving a packet;
   determining a receiving time using i) the time information periodically registered in the table on the hardware region and ii) a counter value of a hardware clock on the hardware region that indicates an elapsed time;
   adding the receiving time to the received packet; and
   transferring, to a transfer destination, the packet to which the receiving time has been added.

6. The non-transitory computer readable medium according to claim 5, wherein the one or more instructions cause the computer to execute:
   correcting the time information periodically registered in the table using the counter value on the hardware clock; and
   adding the corrected time information to the packet as the receiving time.

* * * * *